United States Patent [19]
Christophersen et al.

[11] Patent Number: 4,866,706
[45] Date of Patent: Sep. 12, 1989

[54] TOKEN-PASSING LOCAL AREA NETWORK WITH IMPROVED THROUGHPUT

[75] Inventors: James Christophersen, West Islip, N.Y.; Sheldon Gilbert, Somerville, Mass.; Haig Sarkissian, Forest Hills, N.Y.

[73] Assignee: Standard Microsystems Corporation, Hauppauge, N.Y.

[21] Appl. No.: 89,976

[22] Filed: Aug. 27, 1987

[51] Int. Cl.4 .............................................. H04J 3/26
[52] U.S. Cl. ................................... 370/85.7; 370/94.1
[58] Field of Search ................. 370/89, 94, 85, 60; 340/825.5, 825.1

[56] References Cited

U.S. PATENT DOCUMENTS

| | | | |
|---|---|---|---|
| 4,445,116 | 4/1984 | Grow | 370/89 |
| 4,556,974 | 12/1985 | Kozlik | 370/89 |
| 4,604,742 | 8/1986 | Hamada et al. | 370/89 |
| 4,680,757 | 7/1987 | Murakami et al. | 370/89 |
| 4,701,908 | 10/1987 | Ikeda | 370/89 |
| 4,709,364 | 11/1987 | Hasegawa et al. | 370/89 |

Primary Examiner—Douglas W. Olms
Attorney, Agent, or Firm—Hopgood, Calimafde, Kalil, Blaustein & Kalil

[57] ABSTRACT

A controller is disclosed for use in a local area network preferably of the type having a token-passing protocol. The controller modifies the contents of a data packet or message as it moves on the network media, thereby to intercept, modify and redirect the data message to nodes other than the originally addressed node. In accordance with one embodiment of the invention, the controller is associated with a high-information node (e.g., a file server) connected in a network with a plurality of low-information nodes. The controller modifies the token address transmitted with the token packet from the high-information node after a number of data transmissions so that the token rather than being passed to the next node is returned to the high-information node, thereby allowing a plurality of successive data transmissions to be made in succession from the high-information node to one or more of the low-information nodes.

7 Claims, 3 Drawing Sheets

| | | | |
|---|---|---|---|
| 0 | 0 | 0 | IGNORE THIS BIT |
| 0 | 0 | 1 | * MATCH THIS BIT |
| 0 | 1 | 0 | IGNORE THIS BIT |
| 0 | 1 | 1 | NO MATCH |
| 1 | 0 | 0 | IGNORE THIS BIT |
| 1 | 0 | 1 | NO MATCH |
| 1 | 1 | 0 | IGNORE THIS BIT |
| 1 | 1 | 1 | * MATCH THIS BIT |

TOKEN-PASSING LOCAL AREA NETWORK WITH IMPROVED THROUGHPUT

The present invention relates generally to data communication, and particularly to a token-passing local area network.

Local area networks are commonly employed in a wide variety of applications, typically to transmit data between work stations such as personal computers or the like. In a conventional local area network, the work stations or nodes are connected to a transmission medium such as a cable to allow the transmission of data between the nodes. Associated with each node is a unique address which identifies that node. In order to ensure that a given time only one node can transmit data to another node, various schemes or protocols have been devised. One common technique now in use is the token-passing protocol, in which a token is passed onto the medium from one node to the node with the next highest address. When a node receives the token from a preceding node, it holds the token for a specified period of time and then typically passes the token onto the medium to the node of next highest address.

A node can transmit a data packet to another node in the network only when that node has acquired the token. The data packet includes, in addition to the data being transmitted, the addresses of the transmitting node and the receiving node. Once the token has been passed to another node in the network, the node from which the token was transmitted must then wait until the token has been passed sequentially around the network to all of the other nodes and returned to it, at which time it can, if it has a data packet to transmit, once again transmit a single data packet to another node in the network.

Many local area networks contain a large number of nodes which rarely are required to transmit data packets, and on those occasions in which they do, the data packets are of a relatively low data content, which can usually be included in a single data packet, as well as one or more high-information nodes which are often required to transmit large data packages, typically in the order of 200,000 bytes or more. An example of such a high-information node is a file server that may contain, for example, a software package to implement a specific program, which may on occasion be needed at a low-information node in the network.

Since a typical data packet is limited to 500 bytes, completing the transmission of such large data packages would typically require upwards of 400 separate data packet transmissions, which, in turn, would require the token to be passed around the entire network upwards of 400 times. Thus, transmitting a large data package from one node to another in a local area network may require considerable amount of time, which may significantly reduce the efficiency of the network.

It is an object of this invention to provide a means to conditionally modify the information being transmitted on a local area network in real time and with a minimum amount of relatively inexpensive hardware.

It is another object of the present invention to provide a local area network in which data throughput and the efficiency of data transmission between nodes is significantly improved.

It is a further object of the present invention to provide a token-passing local area network in which the amount of network bandwidth used for information transmission is increased and the amount of bandwidth overhead required to implement the token-passing protocol is decreased.

It is yet another object of the present invention to provide a local area network of the type described in which the above-noted advantages are achieved with a small amount of relatively inexpensive, additional circuitry.

It is yet a further object of the present invention to provide in a local area network having a token-passing protocol and a relatively few number of high-data transmission nodes and a larger number of low-data transmission nodes, a means for decreasing the overall time required to transmit large data packages from the former to the latter.

The present invention as broadly conceived is directed to the modification in a local area network of a packet to permit the packet to be redirected or intercepted within or along the network. In one embodiment of the invention as herein described the local area network employs a token-passing protocol and includes a relatively few high-data transmission nodes or servers and a larger number of low-data transmission nodes or workstations.

Each low data transmission node is provided with a conventional controller which has a unique address on the network as described above. Each high-data transmission node is provided with two conventional controllers, referred to here as controllers A and B, that have consecutive addresses, along with a novel auxiliary control circuit in accordance with the present invention. Controller B of a high-data transmission node will receive the token from controller A of that same node, and the novel circuitry of the invention will modify the address of tokens sent from controller B so that these tokens are returned to controller A. This process is repeated until the transmission of the data from the high-data node is completed and the token from controller B is then allowed to pass on to the node in the network with the next highest address as would have occurred in a conventional network without the novel circuit of the present invention.

To the accomplishment of the above and such further objects as may hereinafter appear, the present invention relates to an improved local area network substantially as defined in the appended claims, and as defined in the following detailed description of the invention as considered along with the accompanying drawings in which:

Figure 1:
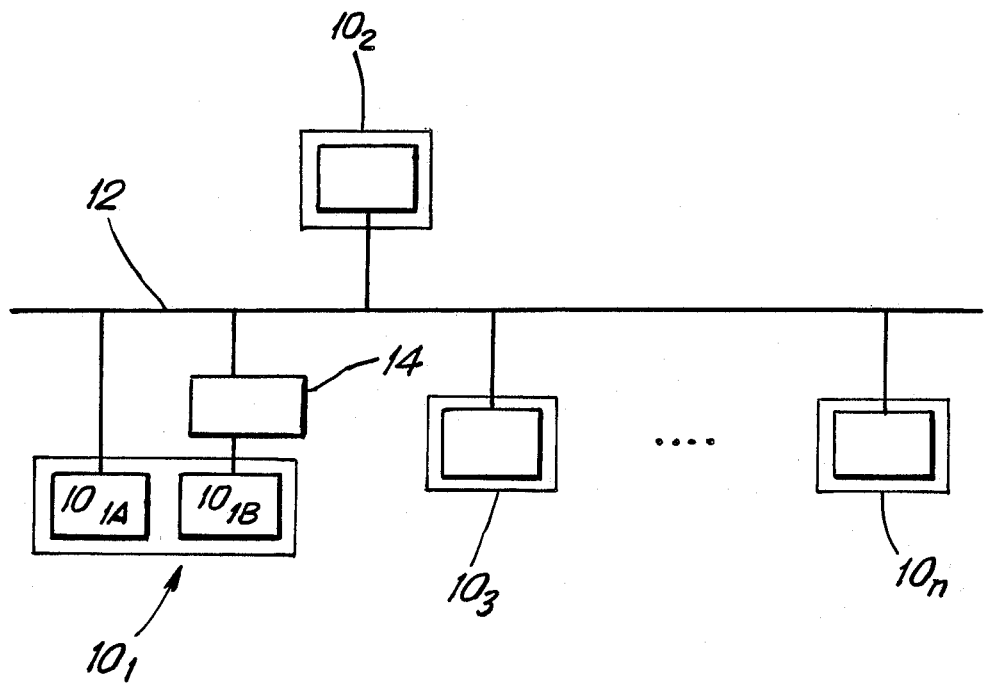
FIG. 1 is a schematic diagram of a token-passing local area network embodying the present invention.
Figure 4:
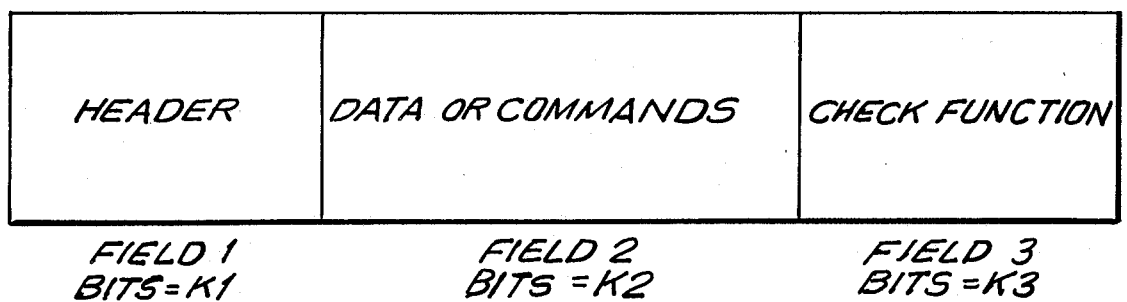
FIG. 4 is schematic representation of a typical packet that can be employed in the local area network of the invention.

FIG. 1 illustrates schematically a local area network of the type utilizing a token-passing protocol, such as that identified as an ARCNET, in which the present invention may be used to advantage. As therein shown, the network includes a plurality of nodes $10_1$, $10_2$, $10_3$, ... $10_n$ interconnected by means of a medium such as a coaxial cable 12. Each of the nodes 10 is essentially made up of a per se conventional controller, such as the COM 9026 made and sold by Standard Microsystems Corporation. As in a per se conventional local area network, each node 10 has the ability to transmit a data packet, such as the one illustrated in Fig. 4, to another node in the network. As illustrated in FIG. 4 the packet includes a header which includes the addresses of the transmitter and receiver nodes, a data or command portion, and a check function portion, which enables the receiving node to check the accuracy of the data.

To prevent more than a single node from sending a data packet at a given time, the token is passed around the network from node to node. A node can transmit data only when it has possession of the token. Once a node has transmitted a data packet to another designated node, it also must then, in a conventional token-passing local area network, pass the token to the next node. As is, per se conventional, the detection and passing of the token around the network as well as the other logic and control functions associated with each node are carried out in the node controller.

In certain applications of local area networks it has been found desirable to be able to intercept or redirect the token or to otherwise modify either the address or data portions of a packet that is transmitted about a local area network. For example, a local area network may include many nodes that rarely transmit data packets and a relatively few nodes that are called upon to transmit a large number of data packets to the other nodes in the network. An example of the latter type of node is a file server, which, in FIG. 1, is designated as node $10_1$. In accord with the present invention, as in the embodiment herein specifically described, an additional conventional controller and a novel control circuit is associated with one or more of the nodes 10 in the network. In the embodiment of the invention illustrated in FIG. 1, the novel circuit 14 is connected between the additional conventional controller of the high-data node $10_1$ and the network, and is effective, as described below, to modify the token from the controller so as to increase the efficiency of data transmission or throughput between the high-data node $10_1$ and the other nodes in the network. In this manner the amount of network bandwidth used for information transmission is increased and the amount of bandwidth overhead required to implement the token-passing protocol is decreased.

To this end, the primary controller of the high-data node, $10_{1A}$, receives the token from the network and then transmits a data packet onto the network if that node $10_1$ has a packet awaiting transmission at that time. Controller $10_{1A}$ then passes the token as is per se, conventional, to the controller with the next largest address on the network which is controller $10_{1B}$ because controllers $1$-$_{1A}$ and $10_{1B}$ are required to have consecutive addresses. Controller $10_{1B}$ receives the token from controller $10_{1A}$ and transmits another data packet onto the network from node $10_1$ if there is another packet awaiting transmission. Controller $10_{1B}$ then generates and sends a token, as is conventional, for the next highest address on the network. This token passes through the auxiliary control circuit 14, which modifies a predetermined portion of the packet, here the token address, and causes the token to return to conventional controller $10_{1A}$ for node $10_1$, so that rather than being passed completely around the network before it is returned to node $10_1$ for a subsequent transmission of a packet, the token is returned directly to node $10_1$, which can then proceed to transmit its next packet. This process can be repeated under the control of the auxiliary control circuit 14 either until node $10_1$ has completed its transmission of information to another node(s) in the network, or until a predetermined time interval has expired to avoid violating any network token-passing protocol restrictions.

Figure 2:
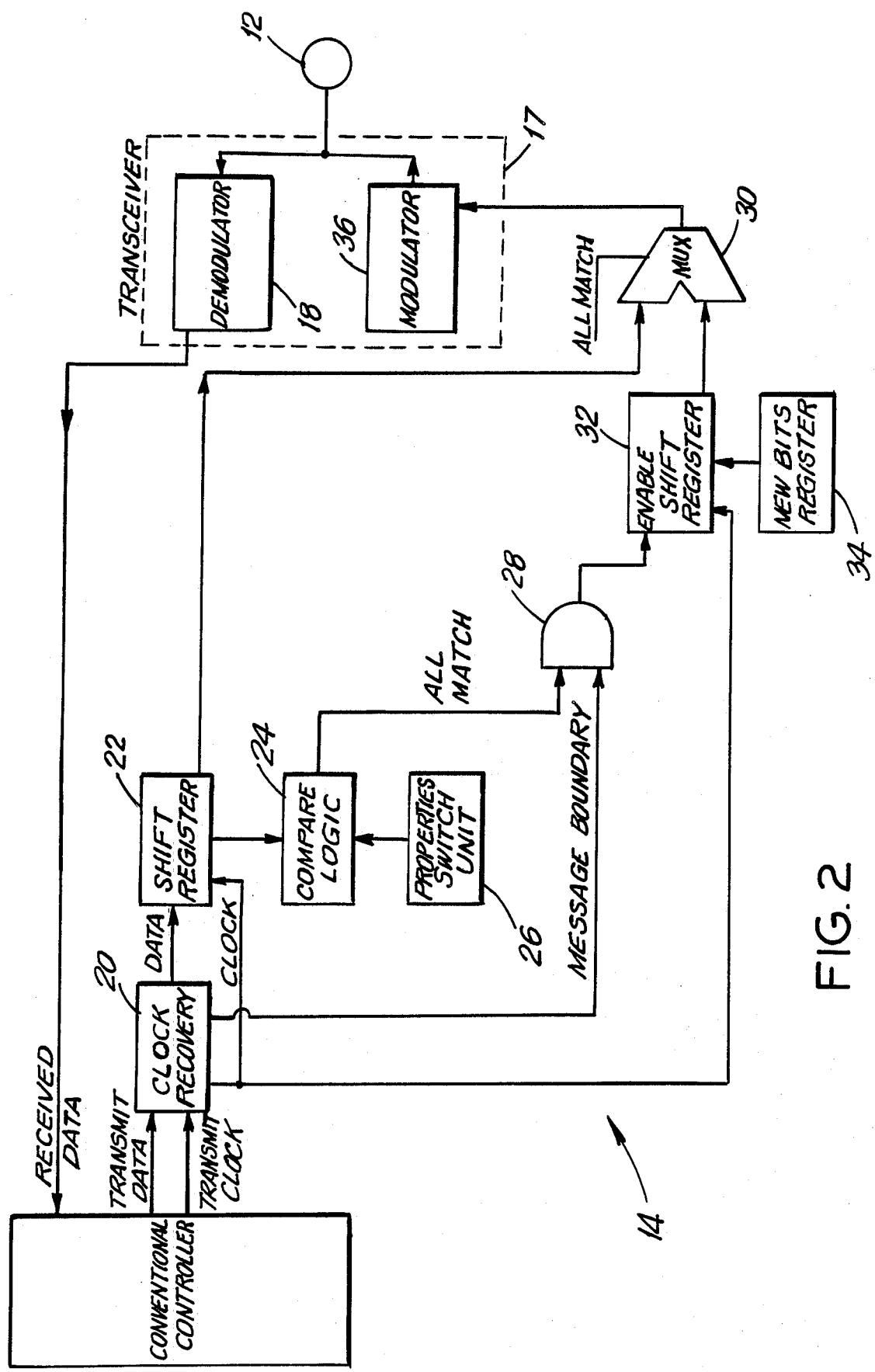
FIG. 2 is a schematic block diagram of a portion of the auxiliary controller of the invention.

The auxiliary control circuit 14, as schematically illustrated in FIG. 2, includes a clock recovery circuit 20 that generates word boundary and message boundary signals from the transmit data and transmit clock signals that are generated by the conventional controller. The word boundary signal along with the transmit clock signal is used to clock the transmit data through a shift register 22.

A preselected N-bit portion of the bits that make up the message describes the type or function of the message, such as a token message, for example. Other bits in the message are variable and carry specific information such as the address of the sending and receiving nodes. These functions or type-defining bits may be considered as a template that defines the kind of message that is currently stored in shift register 22. The N bits stored in shift register 22 are applied to a compare logic circuit 24 with "don't care" bits illustrated in FIG. 3 and described in greater detail later in this specification. The portion of the overall data packet that is applied from shift register 22 to compare logic circuit 24 is that portion which describes the type or function of the message. Compare logic circuit 24 also receives data from a properties switch unit 26, which may be in the form of a series of analogue toggle switches or a key board from which desired binary signals may be inputted.

The properties switch 26 is preset to provide a series of binary bits to the compare logic circuit 24 corresponding to the data message template bits from the message stored in shift register 22. Preferably, properties switch 26 provides two bits for each of the N bits in the message template signal provided from the shift register 22 to the compare logic circuit 24. One of the bits in each bit pair is intended to indicate that the bit in that particular position in the data is or is not to be used in the logic comparison, and the other bit is intended to indicate the logic value of the data position when it is involved in the logic comparison in compare logic circuit 24.

When the N-bits from the shift register 22 are matched to the appropriate bits applied to compare logic circuit 24 from the properties switch unit 26, compare logic circuit 24 produces an ALL MATCH signal indicating that a message of the desired type is presently being observed. The ALL MATCH signal is applied, as shown in FIG. 2, to one input of an AND gate 28 as well as to a control bit of a multiplexer 30, which, in the embodiment of FIG. 2, has two inputs and one output. The inputs to the multiplexer 30 are the data from shift register 22 and the data from a second shift register 32.

The output of AND gate 28, which receives a message boundary signal from the clock recovery circuit 20 at its other input, is applied to the input of shift register 32, which also receives binary signals from a new bits register 34. New bits register 34 contains the logic address of the node to which all or part of the packet from the controller $10_{1B}$ is to be redirected. In the embodiment of the invention herein described, new bits register 34 has stored therein an address for the token that corresponds to the address of the high data node controller $10_{1A}$. The output of multiplexer 30 is applied to an input of a modulator 36, the output of which is applied to the cable 12.

Modulator 36 is included in a transceiver 17, which further includes a demodulator 18. The demodulator 18 is connected to the cable 12 and demodulates messages on the cable and applies the received data to the conventional controller.

In operation of the auxiliary control circuit 14, when an ALL MATCH signal and message boundary signal are both present, the token address data from shift register 32 is selected through multiplexer 30 in place of the original address data in the token packet. In this manner, the data outputted from the multiplexer 30 to the modulator 36 and placed on the cable 12 contains the address of the high-data node controller $10_{1A}$ rather than the address of the succeeding node. This in turn causes the token to be returned to the high-data node $10_1$ for subsequent additional data package transmissions to other nodes in the network. This process is continued under the control of the node $10_1$ until either the data transmission is completed or until a predetermined time interval has expired after which the token is allowed to be passed to the next node or to any other node in the network.

Figure 3:
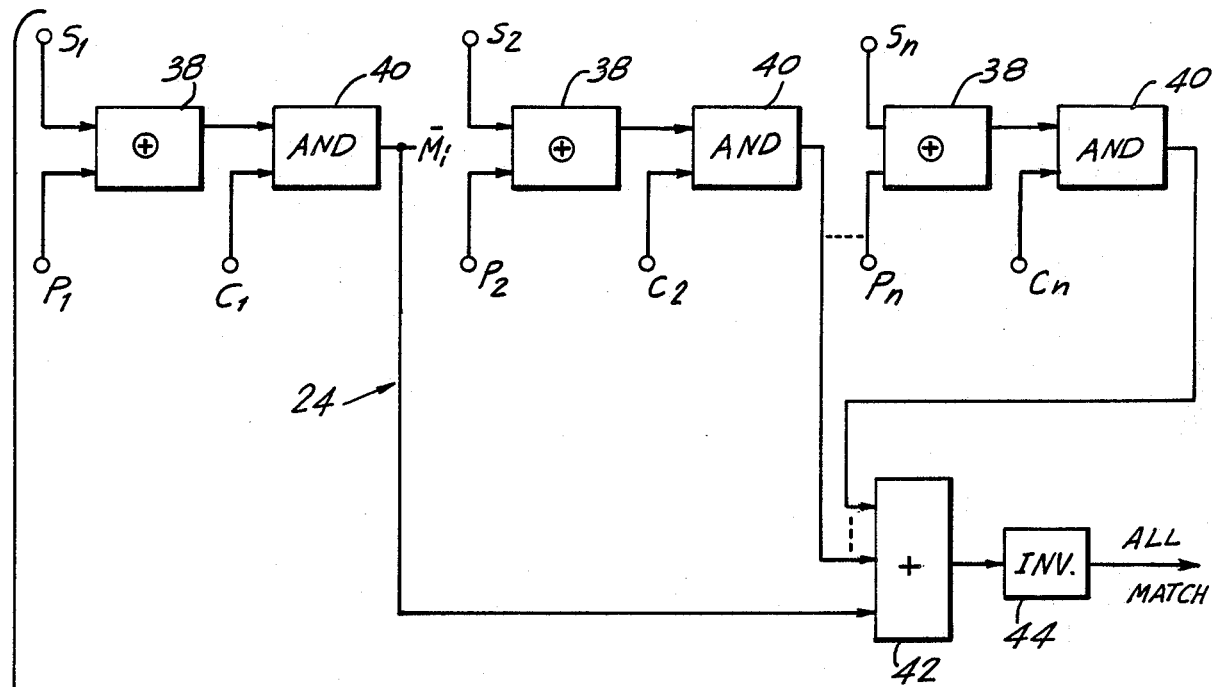
FIG. 3 is a schematic block diagram of the compare logic which may be employed in the auxiliary controller of the invention.

FIG. 3 illustrates the logic portion of compare logic circuit 24 to perform the operation of comparing the bits in shift register 22 and the bits supplied to the compare logic circuit 24 from properties switch 26. As described previously, properties switch provide two bits for every bit obtained from shift register 22. Those two bits, as designated in FIG. 3, include a data bit P and a control bit C. The data bit received from shift register 22 is designated as bit S.

As shown in FIG. 3, compare logic circuit 24 includes n states, each of which includes an exclusive OR gate 38, which receives an S bit and a P bit from the shift register 22 and properties switch 26, respectively. The output of gate 38 is applies t one input of an AND gate 40, the other input of which is the control bit C. The output of the AND gates 40 from each stage in the compare logic circuit are applied to the input of an OR gate 42, the output of which is applied to the input of an inverter 44. The output of inverter 44 when in the high state is the ALL MATCH signal.

As can be seen from the table accompanying FIG. 3, the output of each stage of compare logic circuit 24 is high only when the bits S and P are at the same logic level and the control bit C is high. When bits S and P are at different logic levels, there is no match. Similarly, if the control bit C is at a low level, the output of gate 38 in the associated state is low indicating that this bit is to be ignored by the compare logic circuit.

It will be appreciated from the foregoing description that the present invention provides a local area network in which data transmission between nodes in the network can be modified to redirect a part or all of a data packet to a pre-selected node in the network, such as, in the embodiment of the invention described, to return the token to a high-data transmitting node to permit that node to complete a data transmission operation without the need to pass the token completely around the network. It will also be appreciated that modifications and variations in the embodiment of the invention described herein may be apparent to those skilled in the art without necessarily departing from the spirit and scope of the invention.

What is claimed is:

1. In a local area network including at least one high-data transmission node and a plurality of low-data transmission nodes said high- and low-data transmission nodes being interconnected by a medium, controller means respectively associated with each of, said nodes, said nodes and said associated controller means including means for transmitting a packet having an address portion to another one of said nodes and for receiving a packet from another of said nodes, each of aid nodes being identified by a single address unique to that node, an auxiliary circuit operatively connected to said high-data transmission node, said auxiliary circuit including means for modifying the address portion of a packet transmitted by said controller associated with said high-data transmission node to that of said high-data transmission node and to cause at least the address portion of said packet to be returned to the controller associated with said one high-data transmission node.

2. In the local area network of claim 1, in which said packet includes a token, said modifying means including means to modify the address of the token.

3. In the local area network of claim 2, in which said modifying means comprises means for providing a modified data portion and switch means for replacing an original data portion in the packet with said modified data portion.

4. In the local area network of claim 3, in which said switch means comprises a multiplexer, and control means for inhibiting transmission of the said original data portion and enabling transmission of said modified data portion.

5. In the local area network of claim 4, further comprising logic means for determining during which portion of a data packet the transmission of said original data portion is to be inhibited by said multiplexer.

6. In the local area network of claim 1, in which said auxiliary circuit includes means for returning the modified packet to said high-data transmission node a number of times sufficient to complete the transmission of data from said high-data transmission node and then to pass on the packet to the next of said nodes in the network.

7. In the local area network of claim 1, in which said controller means associated with said high-data transmission node includes a first controller having a first address coupled to the network and a second controller having a second address corresponding to the second highest address in the network, said auxiliary circuit being operatively connected intermediate said first controller and said network.

* * * * *

UNITED STATES PATENT AND TRADEMARK OFFICE
CERTIFICATE OF CORRECTION

PATENT NO.   : 4,866,706
DATED        : September 12, 1989
INVENTOR(S)  : James Christophersen, Sheldon Gilbert, Haig Sarkissian It is certified that error appears in the above-identified patent and that said Letters Patent is hereby corrected as shown below:

Column 5, line 33 - change the word "states" to "stages"

Column 5, line 36 - change "applies t one" to "applied to one"

Column 5, line 49 - change "state" to "stage"

Signed and Sealed this

Twenty-fifth Day of December, 1990

Attest:

HARRY F. MANBECK, JR.

*Attesting Officer*          *Commissioner of Patents and Trademarks*